(12) United States Patent
Jechoux

(10) Patent No.: US 7,986,651 B2
(45) Date of Patent: Jul. 26, 2011

(54) EVENT-DRIVEN, POWER OPTIMIZED, LINK ADAPTATION ALGORITHM

(75) Inventor: Bruno Jechoux, Biot (FR)

(73) Assignee: Wipro Limited, Bangalore, Karnataka (IN)

( * ) Notice: Subject to any disclaimer, the term of this patent is extended or adjusted under 35 U.S.C. 154(b) by 1057 days.

(21) Appl. No.: 11/772,253

(22) Filed: Jul. 2, 2007

(65) Prior Publication Data

US 2009/0010188 A1 Jan. 8, 2009

(51) Int. Cl.
*G08C 17/00* (2006.01)
(52) U.S. Cl. .......................................... 370/311
(58) Field of Classification Search .................. 370/311
See application file for complete search history.

(56) References Cited

U.S. PATENT DOCUMENTS

| | | | |
|---|---|---|---|
| 7,643,443 B2 * | 1/2010 | Maufer et al. | 370/328 |
| 7,656,901 B2 * | 2/2010 | Strutt et al. | 370/469 |
| 2005/0073989 A1 * | 4/2005 | Wang et al. | 370/349 |
| 2005/0286440 A1 * | 12/2005 | Strutt et al. | 370/253 |
| 2006/0133304 A1 * | 6/2006 | Tanach | 370/311 |

OTHER PUBLICATIONS

IEEE 802.11 RateAdaptation:A Practical Approach, by M.Lacage, H.Manshaei and T.Turletti Planete Project —Research report—May 2004.

A. Kamerman and L.Monteban, WaveLAN-II: A high-performance wireless LAN for the unlicensed band, Bell Lab Technical Journal, 118-133, Summer 1997.
G. Holland, N. Vaidya and P. Bahl, A Rate-Adaptive MAC Protocol for Multi-Hop Wireless Net-works, Mobicom01, ACM, Jul. 2001.

* cited by examiner

*Primary Examiner* — Lester Kincaid
*Assistant Examiner* — Diego Herrera
(74) *Attorney, Agent, or Firm* — Prakash Nama; Global IP Services, PLLC

(57) ABSTRACT

An event-driven, power-saving method of controlling link adaptation for wireless transmission in battery powered stations through selectively controlled PHY parameters uses a PHY parameter controller for selectively changing the PHY parameters. The number of retransmissions required per time unit (herein ReTXrate), and missing ACK numbers (e.g., more than two) are used as first and second link quality metrics in the method, instead of the PER as in prior art. Also, the measured ReTXrate after each packet transmission is used for establishing lower and higher thresholds for the ReTXrate. Based on the lower and higher ReTXrate thresholds and based on said missing ACKs, link adaptation by way of changing the PHY parameters through the PHY parameter controller is triggered. The link adaptation method is especially suitable for VoIP traffic but applies to non VoIP traffic too (e.g., data,) including FTP and web browsing situations, and conserves battery power in mobile stations.

21 Claims, 2 Drawing Sheets

EVENT-DRIVEN, POWER OPTIMIZED, LINK ADAPTATION ALGORITHM

FIELD OF THE INVENTION

This invention relates generally to improvements in enhancing link quality in wireless transmissions, and more particularly to a method of conserving power in transmissions with a battery powered mobile station, simultaneously addressing the link quality.

BACKGROUND OF THE INVENTION

In the field of communications, it is known that at least three different physical (PHY) layers for the IEEE 802.11 WLAN are available (IEEE 802.11a/b/g), and, they all provide multi-rate capabilities for devices. To achieve a high performance under varying conditions, these devices need to adapt their transmission rate dynamically. While the rate adaptation feature is a critical component of their performance, only very few algorithms have been published and the implementation challenges associated with these published algorithms have not been totally resolved.

Reducing the energy consumed by wireless communication devices is perhaps the most important issue in the widely-deployed and exponentially-growing IEEE 802.11 Wireless LANs (WLANs) applications. TPC (Transmit Power Control) and PHY (Physical layer) rate adaptation have been recognized as two most effective ways to achieve this goal. The emerging IEEE 802.11h standard, which is an extension to the current IEEE 802.11 MAC and the high-speed IEEE 802.11a PHY, will provide a structured means to support intelligent TPC. It has been proposed to minimize the communication energy consumption in IEEE 802.11a/h systems by combining TPC with PHY rate adaptation. In one approach, the key idea is to compute offline an optimal rate-power combination table, and then at runtime, a wireless station determines the most energy-efficient transmission strategy for each data frame by a simple table lookup. Known art also provides a rigorous analysis of the relation among different radio ranges and the effect of TPC on the interference in IEEE 802.11a/h systems, which justifies an approach to ameliorating the TPC-caused interference by transmitting the CTS (Clear To Send) frames at a stronger power level. The approach in known art delivers about 20% more data per unit of energy consumption than the PHY rate adaptation scheme without TPC, while outperforming single-rate TPC schemes significantly, owing to the energy-saving capability of PHY rate adaptation.

The wireless medium is known to be associated with certain issues and conditions which reduce the reliability of the medium. Notwithstanding, it is also known that the wireless medium provides mobility, which accommodates variation in the distance between transmitter and the receiver. Presence of objects/obstacles in the medium between the transmitter and the receiver causes reflection of radio waves from these objects, leading to scattering, multi-path and fading due to which the performance degrades. In the case of applications based on the IEEE 802.11 WLAN specifications but using the unlicensed spectrum, performance-degradation may be observed because of interference from other devices operating in the same frequency spectrum. Presence of other objects in the medium between the transmitter and the receiver causes reflection of radio waves from these objects leading to scattering, multi-path and fading due to which the performance degrades. A good measure of the wireless network performance is the throughput that is made available to the application. Performance degradation reduces the throughput available to the application and is not desirable for applications which demand reasonable and reliable throughput, especially for VoIP type applications.

Various methods of approach have been addressed for link adaptation purposes as exemplified by the following U.S. Pat. No. 6,122,293, (Method and System for Link Adaptation having a variable update interval); U.S. Pat. No. 6,289,217 (Adaptive radio Link); U.S. Pat. No. 6,385,462, (Method and System for criterion based adaptive power allocation in a communication system with selective determination of modulation and coding); U.S. Pat. No. 6,374,117 (Queue based Power control Scheduling); U.S. Pat. No. 6,643,322 (dynamic Wireless Link Adaptation); U.S. Pat. No. 6,728,259 (Link Adaptation Algorithm for Packet based Radio System); and, U.S. Pat. No. 6,760,596 (method and System for bit Rate Adaptation to improve coverage).

However, available methods of transmission and control through link adaptation may sometimes not be suitable for especially VoIP applications which demand power conservation, performance and reliable throughput. It is noted in this context that the use of PER (Packet Error Rate) as a measure of link quality, as done in several prior art approaches is not wholly suitable for VoIP scenarios, since it requires multiple packet transmissions to obtain a statistically valid PER, whereas voice packets in VoIP are less frequent to support generating a valid PER. Also, the use of PER as a measure of link quality is not conductive to conserving the power resource in battery operated units, considering that the payload is small for a VoIP packet, and it is more essential to conserve power rather than maximize throughput.

There is therefore a need to make an innovation in the area of especially VoIP applications in order to enhance efficiency and conserve power in the approach to link adaptation.

SUMMARY OF THE INVENTION

The present invention generally teaches an event-driven, power optimized link adaptation algorithm which can be applied in wireless transmission, not necessarily relying on the PER as a measure of link quality. In the context of the present invention, described hereinafter is an energy based PHY parameter controller which aims to select a set of PHY parameters {TX power, PHY rate and fragmentation threshold (not relevant for VoIP traffic)} which will require the lowest amount of energy for the whole frame exchange including IFS (Inter Frame Space), ACK (Acknowledgment) and potential retries. The present method uses an event-driven state machine which exploits immediate information available after each packet transmission, such as retries-occurrence or missing acknowledgement, for triggering a link adaptation process as needed.

The invention in one form resides in an event-driven power optimized link adaptation method of controlling link quality for wireless transmission with respect to a battery powered station where PHY parameters are selectively controlled, comprising the steps of: measuring number of frame retransmissions required per time unit (herein ReTXrate) as a link quality metric; using measured ReTXrate after each packet transmission or periodically at a predefined period for making comparison with lower and higher thresholds for the ReTXrate; using the comparison of measured said ReTXrate for triggering link adaptation by way of changing the PHY parameters.

In another form, the invention resides in a an event-driven method of controlling link adaptation for wireless transmission with a battery powered station through selectively controlled PHY parameters, comprising the steps of: using a PHY parameter controller for selectively changing the PHY parameters; measuring number of retransmissions required per time unit (ReTXrate) as a link quality metric; using measured ReTXrate after each packet transmission or periodically at a predetermined period for making comparison with lower and higher thresholds for the ReTXrate; using the comparison of measured said ReTXrate for triggering link adaptation by way of changing said PHY parameters.

The above approach is suitable for VoIP traffic and is applicable with modifications to non-VoIP traffic also.

Also included in the ambit of the invention is a computer readable medium encoded with data/instruction which when executed by a computing platform results in execution of a method as recited above.

BRIEF DESCRIPTION OF THE DRAWING

A more detailed understanding of the invention may be had from the following description of preferred examples, to be understood in conjunction with the accompanying drawing wherein.

DETAILED DESCRIPTION

Figure 1:
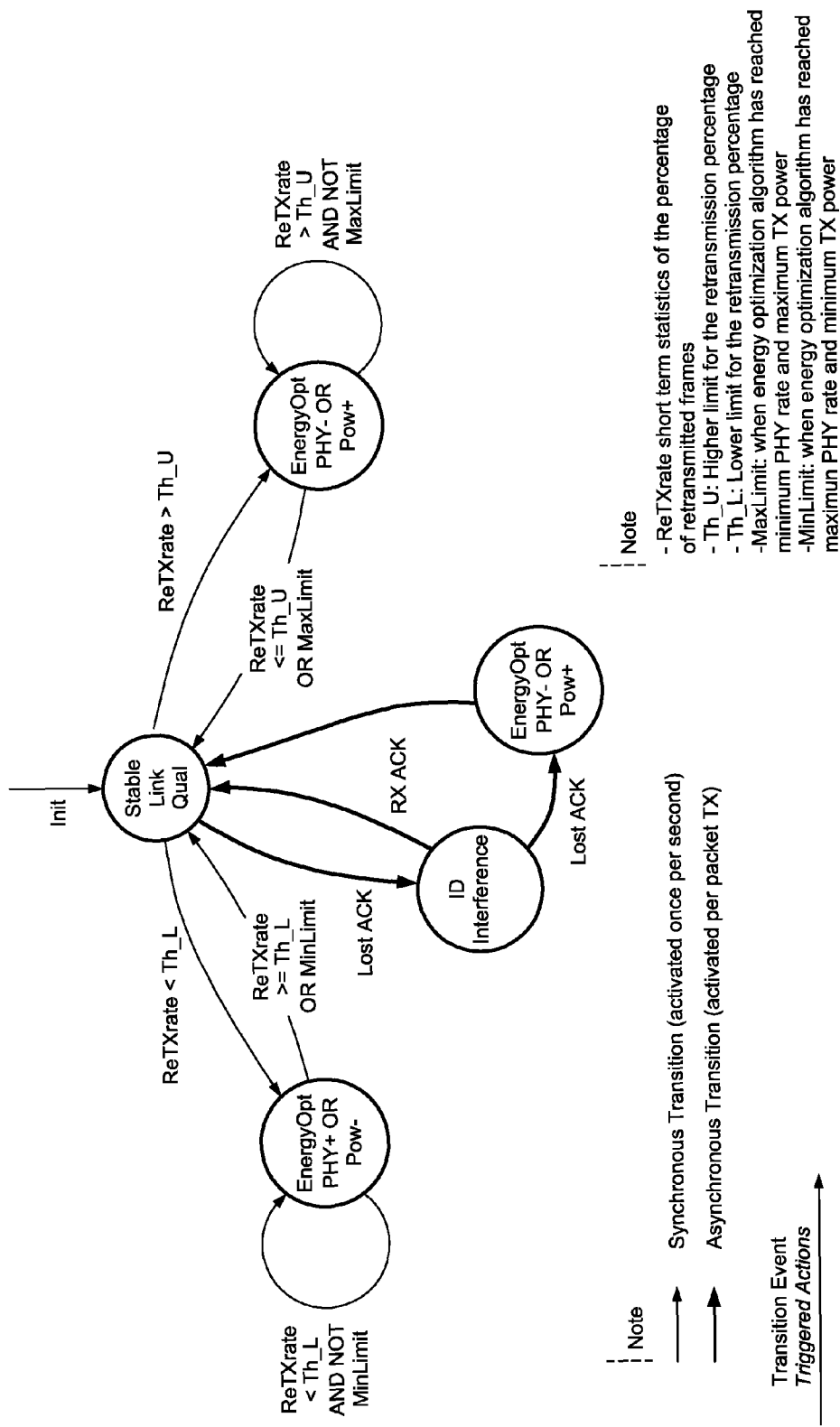
FIG. 1 is a flow chart illustration of a link adaptation machine used in one form of the invention; and, FIG. 2 is a flowchart illustration of a link adaptation machine used in one form of the invention, as extended to non-VoIP traffic.

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims (and their equivalents) and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

Typical link adaptation approaches used hitherto face two issues when applied to battery powered stations, especially for VoIP type of applications:
  PER is not a valid measure of link quality for VoIP applications since the use of PER requires multiple packet transmissions in order to obtain a statistically valid estimation of PER (e.g. for a 5% PER, about 1000 packet transmissions would be required) while the Voice packets are very infrequent (20 ms). Therefore, it would consequently require 20 seconds duration to build the statistics, which duration is not compatible with the radio channel coherence time and interference environment.
  Due to the limited power resource in a battery powered device, the link adaptation must be designed to minimize energy consumption instead of maximizing throughput, e.g., for VoIP packet where payload is very small (~120 bytes). It is noted that increasing the PHY rate by one step is not necessarily effective in terms of successful transmission time due to the PLCP/PHY overhead, but it may be deleterious in terms of retransmissions causing increased energy consumption for the frame transmission.

The proposed link adaptation algorithm as described herein addresses both these issues.

One form of the proposed solution is expediently based on the following two aspects:
  an event-driven state machine which exploits immediate information available after each packet transmission, such as retries-occurrence or missing acknowledgement, to trigger link adaptation process when needed, and,
  an energy based PHY parameter controller which aims at selecting the set of PHY parameters (TX power, PHY rate and selectively fragmentation threshold) which are likely to require the lowest amount of energy for the whole frame exchange, including IFS, ACK and potential retries.

Unlike in the prior art type of statistical driven algorithms for instance based on PER, the first aspect above allows fast responsiveness to the transmission channel-variation despite the very small number of packets transmitted per second. The second aspect stated above minimizes the energy consumption for a given packet transmission.

Functioning in the Present Event-Driven State Machine:

The number of retransmissions per time unit (e.g., per 500 ms), otherwise referred to as ReTXrate is updated after each packet transmission or periodically at a predefined period and compared with triggering lower and higher thresholds. In the present application, ReTXrate serves as a primary link quality metric to trigger link adaptation reactions. In addition, a secondary, fast response, link quality metric used herein is based on the absence of ACK. It aims at recovering the link in case of sudden radio link degradation which is quickly reflected early enough in the ReTXrate metric. The role of the second (fast response) metric is to differentiate acknowledgement losses due to rapid link degradation from those due to interference. More particularly, if one isolated ACK is missing, it is very likely to heave been caused by an interference effect and PHY parameters are kept unchanged, whereas if at least two consecutive ACKs are missing, it is very likely to be due to link-degradation and this calls for the PHY parameters-controller to be deployed.

The following description should be understood in the context of FIG. 1 which illustrates a Link Adaptation State Machine for low rate traffic which may be infrequent, (e.g., VoIP):

Stable Link Qual is a stable state, EnergyOpt_PHY+_Pow− and EnergyOpt_PHY−_Pow+EnergyOpt and ID Interference are transient states.

Stable Link Qual triggers EnergyOpt_PHY+_Pow− and EnergyOpt_PHY−_Pow+ either in reaction to a long term, slowly varying metric (ReTXrate on a given period or a given number of transmitted frames) or in reaction to a fast varying metric (2 consecutively missing acknowledgements). The first one is able to track slowly varying channel conditions such as varying distance between AP (Access Point) and SA (Station), the latter being able to track fast channel quality variations such as due to obstacles and shadowing.

EnergyOpt_PHY+_Pow− selects a less robust configuration. It is invoked when the ReTXrate is below the target range. It estimates the required energy to successfully transmit a frame (including full frame exchanges upon successful completion, i.e., including TX energy, Rx energy and retransmission probability) either with a higher rate/unchanged TX power or with unchanged rate/decreased TX power.

EnergyOpt_PHY-_Pow+ selects a more robust configuration. It is invoked when the ReTXrate is above the target range. It estimates the required energy to successfully transmit a frame (including full frame exchanges upon successful completion, i.e. including TX energy, Rx energy and retransmission probability) either with a lower rate/unchanged TX power or with unchanged rate/increased TX power.

ID Interference differentiates single missing ACKs due to frame collision from fast radio channel degradation.

The controller (PHY parameter controller) estimates the required energy for the whole frame exchange with various PHY parameters. Estimation of the required energy E may be performed using the following formula:

$$E = (\text{Avg\_No\_of\_attempts} - 1) \times [(T_{EIFS} + T_{Backoff}) * P_{LISTEN} + T_{Data} * P_{TX} + T_{SIFS} * P_{LISTEN} + T_{ack} * P_{RX}] + [(T_{AIFS} + T_{Backoff}) * P_{LISTEN} + T_{Data} * P_{TX} + T_{SIFS} * P_{LISTEN} + T_{ack} * P_{RX}]$$

Where:
$P_{LISTEN}$ is the consumed power when listening to the medium,
$P_{RX}$ is the consumed power when receiving a frame,
$P_{TX}$ is the consumed power when transmitting a frame, and,
Avg_No_of_attempts is the number of TX attempts expected for a given TX content.

The controller then selects the PHY parameters which lead to the lowest energy consumption and applies them for the next packet transmission.

The table 1 below shows an example of the equation parameters and their dependencies.

TABLE 1

Equation parameter dependencies

| | PHY rate dependent | TX power dependent | Comments |
|---|---|---|---|
| $T_{DATA}$ | X | | |
| $T_{ACK}$ | X | | AP PHY rate assumed identical to STA's rate, but this may not be the case. Should not have significant impact. |
| $P_{TX}$ | X | X | Also varies with PA bias |
| Avg_No_of_attempts | X | X | Calculated for current PHY configuration, estimated for the others relatively to the calculated one |

Note:
To leverage the energy minimization, it is desirable to perform PA (Power Amplifier) bias control in accordance with the TX power selected by the link adaptation algorithm.

An extension of the present algorithm to other kinds of traffic (FTP, web browsing . . . ) is included in the ambit of the invention as stated below. Saving in power consumption is desirable for portable devices whatever the kind of traffic. The present algorithm can incorporate support for packet fragmentation in order to properly accommodate various packet sizes in traffic. With packet fragmentation and suitable modification, the present approach is then fully applicable to any kind of traffic including non VoIP.

Figure 2:
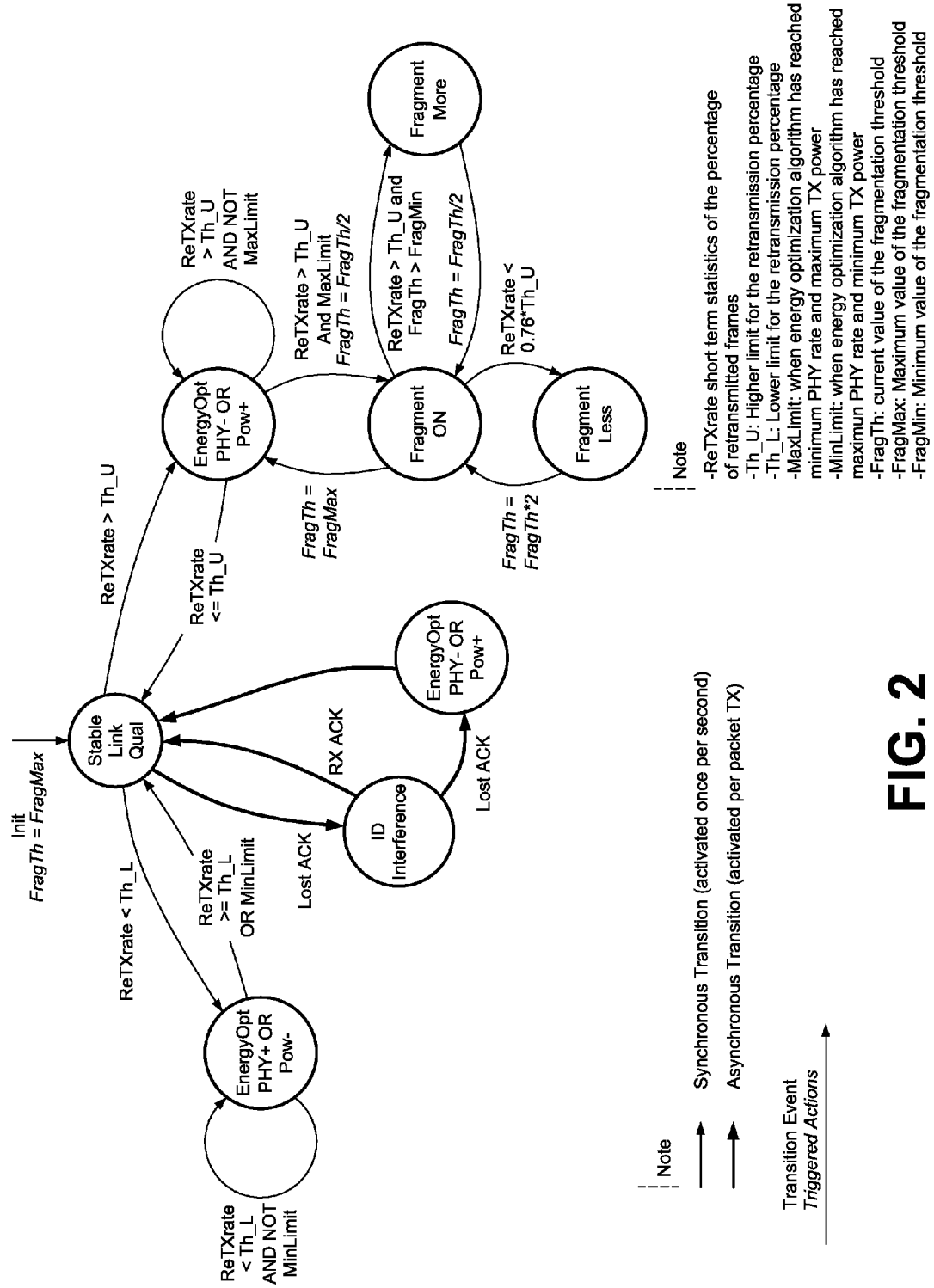

The following description should be understood in the context of FIG. 2 which illustrates a Link Adaptation State Machine for frequent and high throughput traffic (e.g. data) (including for e.g., FTP, Web browsing and non-VoIP traffic): The description above for FIG. 1 is applicable to FIG. 2 also, and in addition, three state branches are added.

Fragment ON is a stable state. Fragment More and Fragment Less are transient states: they are used to apply frame fragmentation as a last chance action when the ReTXrate stays above the target range while the minimum PHY rate and maximum TX power are already applied.

Fragment ON is a stable state. Fragment More and Fragment Less are transient states: they are used to apply frame fragmentation as a last chance action when the ReTXrate stays above the target range while the minimum PHY rate and maximum TX power are already applied.

Fragment ON is invoked from EnergyOpt_PHY-_Pow+ when ReTXrate stays above the target range and EnergyOpt_PHY-_Pow+ has reached its MaxLimit (Max power, Min PHY rate).

The Fragment ON state invokes either Fragment More as long as ReTXrate is above the target range, or Fragment Less as long as ReTXrate is below the weighted highest limit of the target range. The weight is between 0 and 1 and is calculated so that if this condition is accepted, the ReTXrate for bigger packets (less fragmented) will theoretically be still below the target range higher limit.

In a typical implementation, for the sake of simplicity, the fragmentation threshold may be doubled or divided by factor 2.

The foregoing describes an algorithm and a method of controlling link quality in wireless transmission, especially with battery powered stations handling VoIP traffic. It is noted that the use of the retry and ACK based algorithm serves to minimize energy consumption with less emphasis on maximizing throughput. The present invention has several applications including WILD IP low power A/B/G devices.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used are merely labels, and are not intended to impose numerical requirements on their objects.

The invention claimed is:

1. An event-driven power optimized link adaptation method of controlling link quality for wireless transmission with respect to a battery powered station where PHY parameters are selectively controlled, comprising the steps of:
measuring number of frame retransmissions required per time unit (ReTXrate) as a link quality metric:
using measured ReTXrate after each packet transmission or periodically at a predefined period for making comparison with lower and higher thresholds for the ReTXrate;
using said comparison of measured said ReTXrate for triggering link adaptation by way of changing said PHY parameters;
using missing Acknowledgment (ACK) as a second link quality metric in addition to said ReTXrate:
using a PHY parameter controller for the step of changing said PHY parameters; and
using the PHY parameter controller for estimating required energy E for whole frame exchange using the PHY parameters and applying the formula:

$$E = (\text{Avg\_No\_of\_attempts} - 1) \times [(T_{EIFS} + T_{Backoff}) * P_{LISTEN} + T_{Data} * P_{TX} + T_{SIFS} * P_{LISTEN} + T_{ack} * P_{RX}] + [(T_{AIFS} + T_{Backoff}) * P_{LISTEN} + T_{Data} * P_{TX} + T_{SIFS} * P_{LISTEN} + T_{ack} * P_{RX}]$$

where:
$P_{LISTEN}$ is the consumed power when listening to the medium,
$P_{RX}$ is the consumed power when receiving a frame,
$P_{TX}$ is the consumed power when transmitting a frame, and,
Avg_No_of_attempts is the number of TX attempts expected for a given TX context.

2. An event-driven method of controlling link adaptation for wireless transmission with a battery powered station through selectively controlled PHY parameters, comprising the steps of:
using a PHY parameter controller for selectively changing said PHY parameters;
measuring number of retransmissions required per time unit (ReTXrate) as a link quality metric;
using measured ReTXrate after each packet transmission or periodically after a predefined period for making comparison with lower and higher thresholds for the ReTXrate;
using said comparison of measured said ReTXrate for triggering link adaptation by way of changing said PHY parameters;
using missing Acknowledgment (ACK) as a second link quality metric in addition to said ReTXrate;
invoking said PHY parameter controller for the step of changing said PHY parameters, based on measured link quality metric; and
using the PHY parameter controller for estimating required energy E for whole frame exchange using the PHY parameters and applying the formula:

$$E = (\text{Avg\_No\_of\_attempts} - 1) \times [(T_{EIFS} + T_{Backoff}) * P_{LISTEN} + T_{Data} * P_{TX} + T_{SIFS} * P_{LISTEN} + T_{ack} * P_{RX}] + [(T_{AIFS} + T_{Backoff}) * P_{LISTEN} + T_{Data} * P_{TX} + T_{SIFS} * P_{LISTEN} + T_{ack} * P_{RX}]$$

where:
$P_{LISTEN}$ is the consumed power when listening to the medium,
$P_{RX}$ is the consumed power when receiving a frame,
$P_{TX}$ is the consumed power when transmitting a frame, and
Avg_No_of_attempts is the number of TX attempts expected for a given TX context.

3. An event-driven, power-saving method of controlling link adaptation for wireless transmission with a battery powered station through selectively controlled PHY parameters, comprising the steps of:
using a PHY parameter controller for selectively changing said PHY parameters;

measuring number of retransmissions required per time unit (herein ReTXrate) as a link quality metric and using missing Acknowledgment (ACK) as a second link quality metric in addition to said ReTXrate;

using measured ReTXrate after each packet transmission or periodically at a predefined period for establishing lower and higher thresholds for the ReTXrate; and based on said ReTXrate lower and higher thresholds and based on said missing ACKs, triggering link adaptation by way of changing said PHY parameters through the PHY parameter controller, wherein when there is one missing ACK, the PHY parameters are kept unchanged, and wherein when at least two consecutive ACKs are missing, then calling the PHY parameter controller for changing said PHY parameters.

4. The event-driven power saving method of controlling link adaptation as in claim 3, wherein the wireless transmission comprises VoIP traffic, and where the PHY parameters include TX power and PHY rate.

5. The event-driven power saving method of controlling link adaptation as in claim 3, wherein the wireless transmission comprises non VoIP traffic, and where the PHY parameters include TX power, PHY rate and fragmentation threshold.

6. A non-transitory computer readable storage medium encoded with data/instruction which when executed by a computing platform results in execution of a method as in claim 3.

7. An event-driven power optimized link adaptation method of controlling link quality for wireless transmission with respect to a battery powered station where PHY parameters are selectively controlled, comprising the steps of:

measuring number of frame retransmissions required per time unit (ReTXrate) as a link quality metric;

using measured ReTXrate after each packet transmission or periodically at a predefined period for making comparison with lower and higher thresholds for the ReTXrate;

using said comparison of measured said ReTXrate for triggering link adaptation by way of changing said PHY parameters; and using missing Acknowledgment (ACK) as a second link quality metric in addition to said ReTXrate, wherein when there is one missing ACK, the PHY parameters are kept unchanged, and wherein when at least two consecutive ACKs are missing, then calling a PHY parameter controller for changing said PHY parameters.

8. The method as in claim 7 wherein the PHY parameters include TX power, PHY rate, and where applicable, fragmentation threshold.

9. The method as in claim 7 wherein the wireless transmission comprises VoIP traffic.

10. The method as in claim 7 including the step of so selecting said PHY parameters that would result in lowered energy consumption for a whole frame exchange.

11. The method as in claim 10 wherein said whole frame exchange includes IFS (Inter Frame Space), ACK and potential retries.

12. The method as in claim 7 including the step of using the PHY parameter controller for the step of changing said PHY parameters.

13. The method as in claim 7 wherein the wireless transmission comprises non VoIP traffic, the method including the step of using the PHY parameter controller for estimating required energy for a whole frame exchange using the PHY parameter controller for implementing a link adaptation algorithm and selecting the parameters TX power, PHY rate and, as applicable, fragmentation threshold.

14. An event-driven method of controlling link adaptation for wireless transmission with a battery powered station through selectively controlled PHY parameters, comprising the steps of:

using a PHY parameter controller for selectively changing said PHY parameters;

measuring number of retransmissions required per time unit (ReTXrate) as a link quality metric;

using measured ReTXrate after each packet transmission or periodically after a predefined period for making comparison with lower and higher thresholds for the ReTXrate;

using said comparison of measured said ReTXrate for triggering link adaptation by way of changing said PHY parameters; and using missing Acknowledgment (ACK) as a second link quality metric in addition to said ReTXrate, wherein when there is one missing ACK, the PHY parameters are kept unchanged, and wherein when at least two consecutive ACKs are missing, then calling the PHY parameter controller for changing said PHY parameters.

15. The method as in claim 14 wherein the PHY parameters include TX power, PHY rate, and where applicable, fragmentation threshold.

16. The method as in claim 14 wherein the wireless transmission comprises VoIP traffic.

17. The method as in claim 14 including the step of so selecting said PHY parameters that would result in lowered energy consumption for a whole frame exchange.

18. The method as in claim 17 wherein said whole frame exchange includes IFS (Inter Frame Space), ACK and potential retries.

19. The method as in claim 14 including the step of invoking said PHY parameter controller for the step of changing said PHY parameters, based on measured link quality metric.

20. The method as in claim 14 wherein the wireless transmission comprises non VoIP traffic, the method including the step of using the PHY parameter controller for estimating required energy for a whole frame exchange using the PHY parameter controller for implementing a link adaptation algorithm and selecting the parameters TX power, PHY rate and fragmentation threshold.

21. A non-transitory computer readable storage medium encoded with data/instruction which when executed by a computing platform results in execution of a method as in claim 14.

* * * * *